United States Patent [19]

Ferraro

[11] Patent Number: 4,683,096
[45] Date of Patent: Jul. 28, 1987

[54] METHOD OF SECURING A SHAVING AID TO A RAZOR CARTRIDGE

[75] Inventor: Frank A. Ferraro, Trumbull, Conn.

[73] Assignee: Warner-Lambert Company, Morris Plains, N.J.

[21] Appl. No.: 824,498

[22] Filed: Jan. 31, 1986

[51] Int. Cl.⁴ .............................................. B29C 65/00
[52] U.S. Cl. ...................................... 264/249; 29/509; 30/41; 30/90
[58] Field of Search ................... 29/509, 511; 30/34.2, 30/90, 41; 264/249

[56] References Cited

U.S. PATENT DOCUMENTS

| | | | |
|---|---|---|---|
| 2,431,238 | 11/1947 | Friedman | 264/249 |
| 2,916,226 | 12/1959 | McGraw, Jr. | 29/511 UX |
| 3,418,410 | 12/1968 | Einfalt | 264/249 X |
| 4,170,821 | 10/1979 | Booth | 30/41 |

FOREIGN PATENT DOCUMENTS

| | | | |
|---|---|---|---|
| 475074 | 8/1969 | France | 30/41 |
| 2035168 | 6/1980 | United Kingdom | 29/509 |

Primary Examiner—Charlie T. Moon
Attorney, Agent, or Firm—Howard Olevsky; Stephen Raines

[57] ABSTRACT

A method of securing a strip of solid shaving aid to a face-engaging surface of a disposable razor cartridge.

3 Claims, 2 Drawing Figures

METHOD OF SECURING A SHAVING AID TO A RAZOR CARTRIDGE

BACKGROUND OF THE INVENTION

The present invention relates to safety razors and relates in particular to disposable razors.

Disposable razors to which this invention pertains may take the form of a single or twin bladed cartridge where each blade is formed with a single cutting edge.

In addition, the razor cartridge may include an integrally attached handle or may be of the type which connects releasably to a handle by means of a track or a pivotal connection in well-known fashion.

U.S. Pat. No. 4,461,079 shows a typical track, U.S. Pat. No. 4,428,116 shows a typical pivotal connection, and U.S. Pat. No. 4,425,705 shows an integrally attached handle to form a unitary structure.

The present invention relates, in particular, to the cartridge structure shown and described in U.S. Pat. No. 4,170,821, especially the FIG. 1 embodiment thereof.

More particularly, the invention relates to a method of securing a shaving aid such as is shown in the FIG. 1 embodiment of the U.S. Pat. No. 4,170,821 in a secure and permanent fashion.

A related copending application, U.S. Ser. No. 780,767 filed Sept. 27, 1985, by Vincent C. Motta et al. entitled RAZOR CARTRIDGE WITH SHAVING AID AND METHOD OF MANUFACTURE, discloses and claims an alternative method of securing a shaving aid.

It is to be understood that the term "cartridge" as used herinafter in this specification and claims is intended to denote a blade package which may contain one or more single cutting edge blades and the blade package may have an integrally formed handle so that the blade package and the handle are permanently connected. In the alternative, the term "cartridge" may denote a unitary blade package which is adapted to connect releasably to a handle.

In the aforementioned U.S. Pat. No. 4,170,821, an elongation solid strip of water-soluable shaving aid material is shown (in FIG. 1) received in a recess formed in a face-engaging surface (cap) of the razor.

One method of securing the strip to the razor cap has involved the use of adhesive. While this process is effective, it has certain drawbacks, such as the difficulty in controlling the application of proper amounts of adhesive in uniform fashion. In addition, the time required to set the adhesive and the pressure required to insure good contact sometimes slow high-speed mass production operations.

SUMMARY OF THE INVENTION

Consequently, it is a principal object of the present invention to provide a method of securing a shaving aid permanently to a face-engaging surface of a razor cartridge which is free of the problems associated with an adhesive process.

It is a further object of the invention to provide a method of securing a shaving aid to a razor cartridge which lends itself to modern high-speed mass production operations.

It is a still further feature of the present invention to provide a manufacturing procedure which involves a minimum number of process steps where the steps are free of critical limitations.

A method of securing a solid shaving aid to a razor cartridge fabricated from a deformable material may comprise the steps of forming a recess in a face-engaging surface of the cartridge, depositing said solid shaving aid into said recess, and thereafter deforming said cartidge to an extent sufficient to retain said solid shaving aid permanently within said recess.

Other features and advantages of the present invention will become more apparent from an examination of the succeeding specification when read in conjuction with the appended drawings, in which:

DESCRIPTION OF PREFERRED EMBODIMENT

Figure 1:
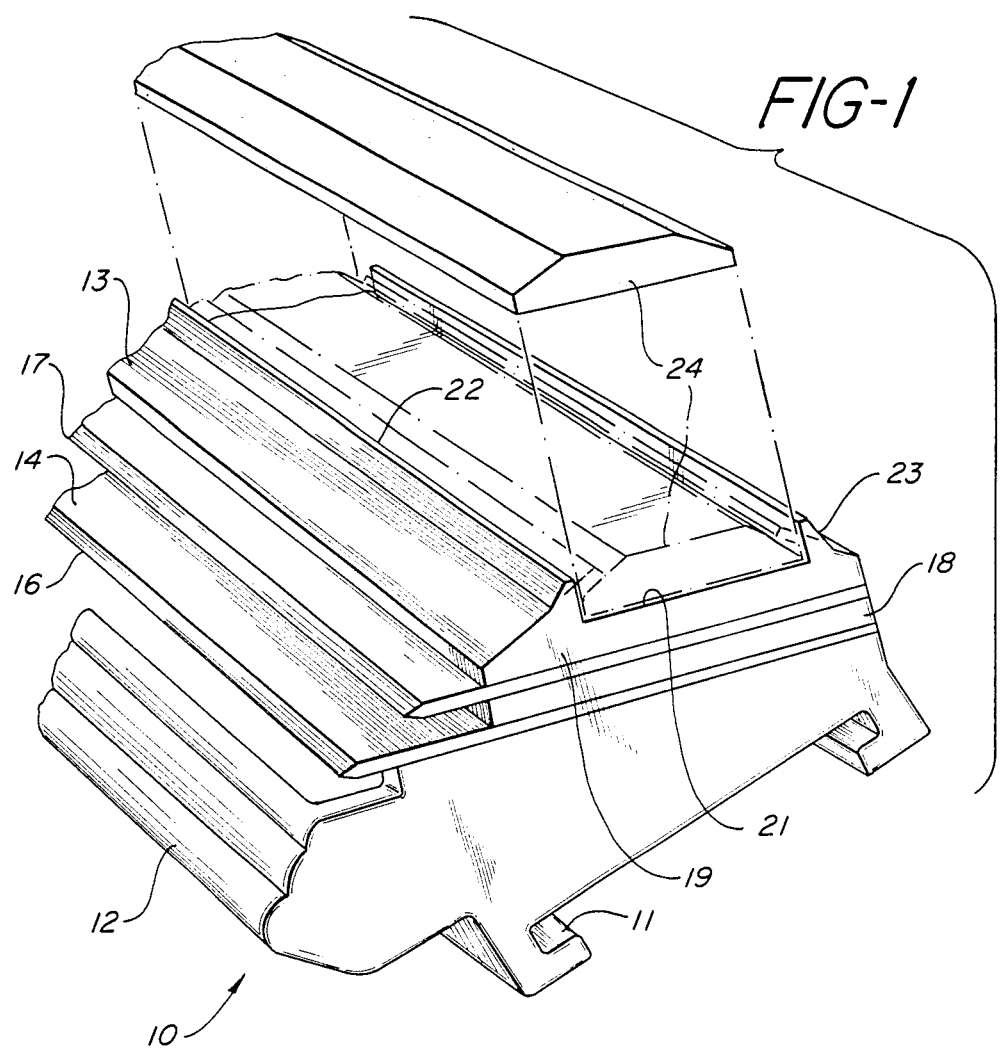
FIG. 1 is a perspective view of a portion of a razor cartidge showing a solid strip of a shaving aid before and after combination with a face-engaging surface (cap) of the cartridge.

The reference numeral 10 designates a disposable razor cartridge having a track 11 for making a releasable connection to a razor handle (not shown).

The cartridge includes a guard bar 12, twin blades 13 and 14 each having a cutting edge 16 and 17, respectively, separated by a usual and customary spacer 18.

The cartridge 10, fabricated of a deformable material, which in the disclosed embodiment is a polymeric resin, also includes a face-engaging surface 19, sometimes referred to as a "cap".

The cap 19 is formed (molded) with a well or a recess 21 bounded by deformable ribs or fins 22 and 23.

An elongated, solid shaving aid 24, shaped in general conformity with the recess, is received in the recess while the ribs or fins 22–23 are in the solid line position.

Figure 2:
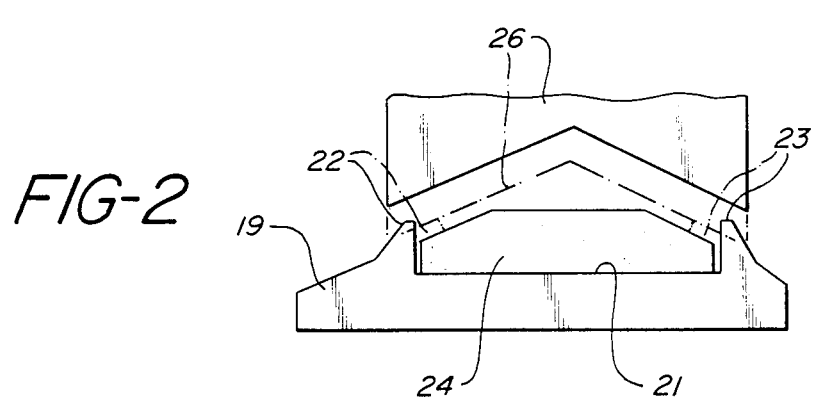
FIG. 2 shows a forming tool for deforming or shaping the cartridge to secure the shaving aid permanently to the cartridge.

Thereafter the fins are deformed to the dotted line position by forming tool 26 (FIG. 2) effective to crimp or fasten the shaving aid securely and permanently to the face-engaging surface 19 of the cartridge 10.

While the fins shown are continuous, it is entirely within the spirit and scope of the invention that the fins be interrupted by cutouts so that the crimped fins are discontinuous and are spaced apart along the length of the strip.

In addition, depending upon the deformation characteristics of the material from which the cartridge is fabricated, it is possible to eliminate the fins and effect the crimping step by peening or upsetting spaced points along the margin or border of the recess to move cartridge material over portions of the strip to secure the strip to the cartridge.

It is anticipated that the forming tool be shaped appropriately consistent with the crimping pattern desired.

Furthermore, it is further anticipated that the deformable material may be cold-worked or hot-worked depending upon the deformation characteristics of the material from which the cartridge is fabricated.

It is anticipated that numerous variations in structure, design or exterior ornamentation may be devised without departing from the spirit and scope of the method steps of the present invention.

What is claimed is:

1. Method of securing a solid shaving aid having outwardly facing tapered longitudinal edges to a razor cartridge where the cartridge is fabricated of a deformable plastic material comprising the steps of:

(a) forming a recess in a face-engaging surface of the cartridge parallel to a cutting edge of the blade;

(b) providing deformable fins along the margins of said recess parallel to a cutting edge of the blade;

(c) depositing the shaving aid with said tapered edges facing outwardly and parallel to the cutting edge of said blade into said recess; and (d) thereafter deforming the fins over said tapered edges to an extent sufficient to retain said aid permanently within said recess with the shaving aid between said tapered edges protruding above the adjacent surface of said razor cartridge.

2. The method of claim 1 plus the step of interrupting the continuity of said fins with spaced cut-outs.

3. The method of claim 1 where the deformation step defines peening.

* * * * *